3,334,863
TURBINE
Per Harry Engvall, Trenton, N.J., assignor to De Laval Turbine Inc., Trenton, N.J., a corporation of Delaware
Filed Nov. 6, 1964, Ser. No. 409,455
3 Claims. (Cl. 253—39)

This invention relates to turbines, and particularly to a sealing device to be incorporated therein for use during pressure testing of the boiler and connections associated with the inlet to a turbine.

Boilers used in conjunction with steam turbines are required to undergo periodic hydrostatic tests which comprise subjecting the interior of the boiler to very high pressures by introducing water into them by means of pumps.

In making such tests, it is not desirable to close off the inlet port to the turbine associated with the boiler being tested, since the connections between the turbine and the boiler would not be tested if this were done. However, the leak-off pipes from the glands of turbines are not ordinarily capable of withstanding pressures as high as those to which boilers are subjected during tests, and consequently, it is desirable to provide a simple method by which the leak-off pipes from the glands are closed off from the inlet to the turbine being tested.

In the present invention, isolation of the leak-off pipes from the inlet of the turbine is accomplished by providing sealing members on the rotor which can be made to engage seals provided in the housing by altering the position of the rotor with respect to the housing.

The principal object of the present invention is to provide a simple and economical means whereby the outlet pipes from the glands are protected from damage due to their being subjected to full test pressure.

A further object is to provide means for protecting the leak-off pipes of a turbine being tested, which are self-contained within the turbine, and which need not be removed when the turbine is being operated.

Figure 1:
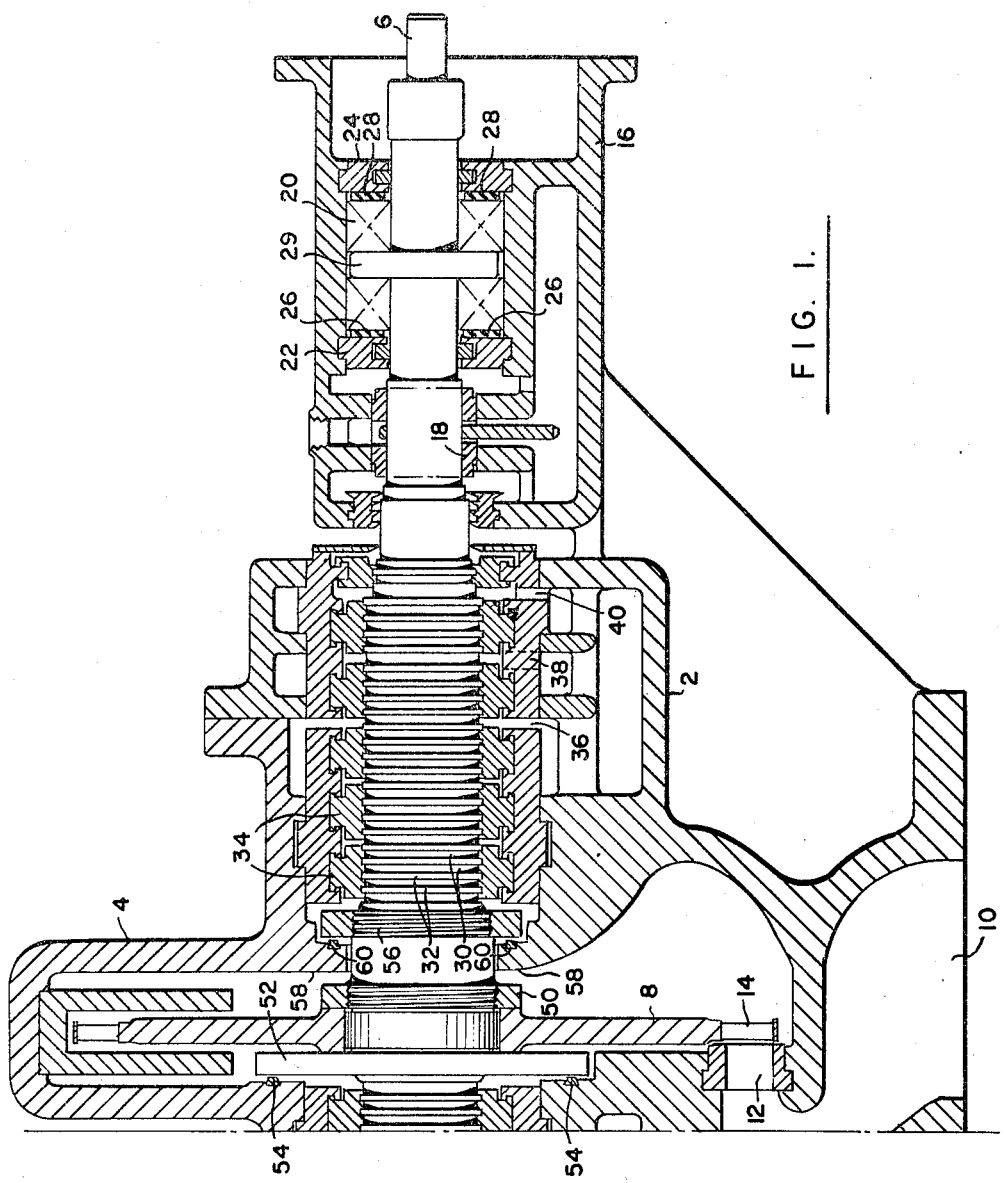
Figure 2:
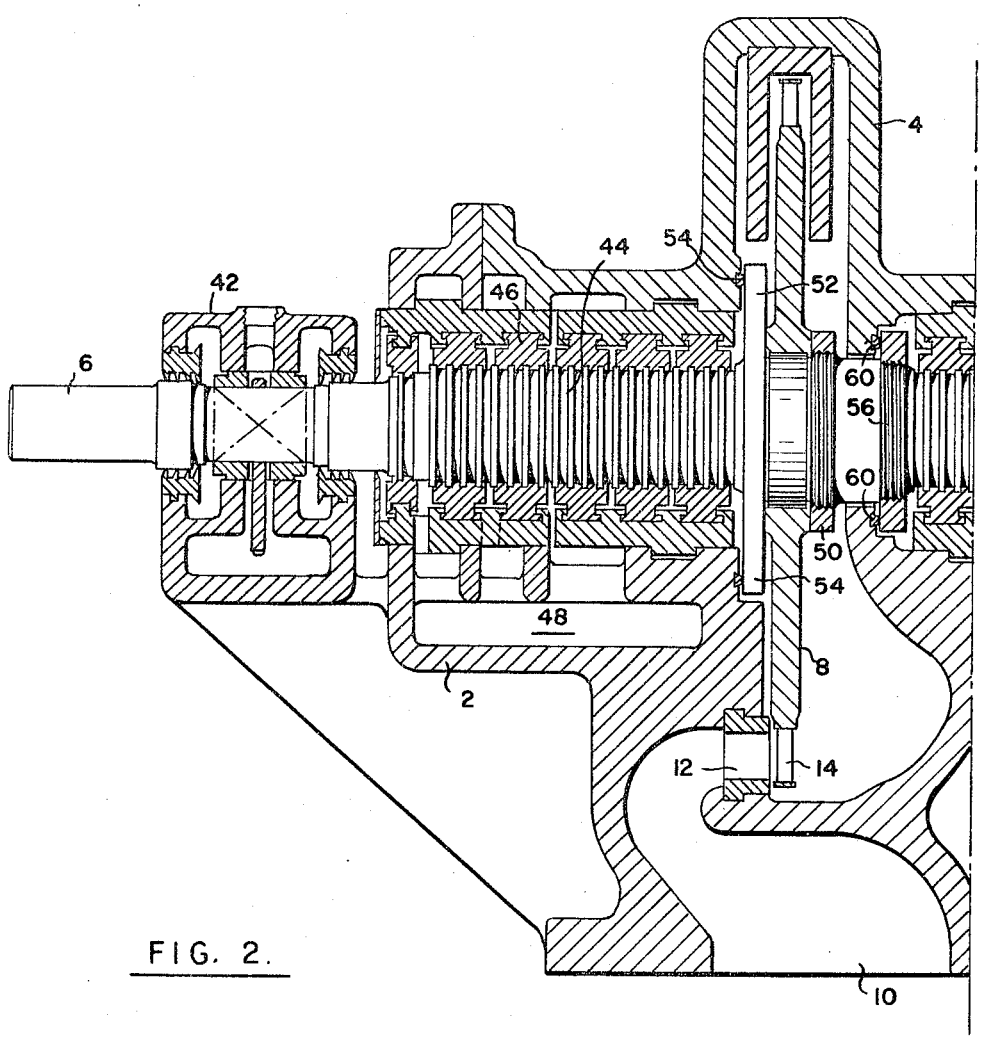

These and other objects of the present invention will become apparent from the following description when read in conjunction with the accompanying drawings in which:

FIGURE 1 is a vertical section of part of a turbine provided with a modification in accordance with the present invention, and showing the turbine rotor in the normal operating position; and FIGURE 2 is a vertical section of another part of the same turbine, showing the rotor in the test position.

Referring to FIGURE 1, a lower portion 2 of a conventional turbine housing is provided with an upper housing portion 4 to provide a horizontally split housing. A shaft 6 extending through the housing is secured to the turbine wheel 8. The lower portion 2 of the housing is provided with an inlet port 10 to deliver steam through nozzles 12 to the blades 14 provided on the wheel in usual fashion.

A bearing housing 16 is provided at the right end of shaft 6. Housing 16 contains a journal bearing 18 and a thrust bearing 20, which is held in position within the housing between members 22 and 24 by shims 26 and 28. The thrust bearing cooperates with collar 29 on the shaft.

Shaft 6 is also provided with a plurality of alternate grooves 30 and ridges 32 which cooperate with grooves and ridges on members 34 to provide a conventional labyrinthine packing to permit steam and air leakage through withdrawal passages 36, 38 and 40.

Referring to FIGURE 2, at the opposite end of the turbine, journal bearing housing 42 is shown.

Labyrinthine packing is provided about the shaft at this end of the turbine by the ridges and grooves 44 and cooperating members 46. Various leak-off passages communicate from points along the labyrinthine passage to the common leak-off passage 48.

It will be seen that both figures show the central section of the turbine comprising the wheel and blade assembly. Referring to FIGURE 1, wheel 8 is held in position on the shaft by threaded collar 50, which is tightened to hold the wheel against a seal collar 52 forming part of the shaft. The housing adjacent to collar 52 is provided with a pair of semi-circular sealing members 54 which together provide a substantially complete circular seal when assembly is completed. A threaded collar 56 is also provided on the shaft, and annular portion 58 of the interior of the housing is provided with a pair of semi-circular sealing members 60 which jointly provide a substantially complete circular seal when the assembly is completed. The diameter of the seal provided by members 54 is considerably greater than that provided by members 60, as shown.

When the rotor is in the position shown in FIGURE 1, steam passing into the interior of the housing through nozzle 12 will be allowed to pass around collars 52 and 56 and past the seals 54 and 60 to escape through the respective labyrinthine passages on either side of the rotor, the seals being spaced slightly from the collars to permit this flow.

To close off the labyrinthine passages from the rotor chamber, the upper part of bearing housing 16 is removed, and shims 26 are removed. The entire rotor and shaft assembly is moved toward the left through the use of a suitable jack so that collar 52 tightly engages sealing members 54 and collar 56 tightly engages sealing members 60 as depicted in FIGURE 2.

When the rotor is in the position shown in FIGURE 2 water at test pressure may be introduced through passage 10 into the rotor chamber, but its introduction into the labyrinthine passages and to the glands is prevented. Since the effective area of collar 52 exposed to the test water is considerably greater than that of collar 56, the test water will further urge the collars against the seals to insure effective sealing. The effective areas of the respective collars are equivalent to the areas enclosed by the seals cooperating with them.

Slight leakage past the seals 54 and 60 is permissable if the drainage passages from the glands are open since the pressure drop across the seals will be sufficiently great for maintenance of the test pressure.

The differences between FIGURES 1 and 2 are somewhat exaggerated for the purpose of clarity, and it will be apparent that the shaft and rotor assembly need not be moved to the right any further than necessary to assure clearance between the collars and seals during operation. This amount of movement must be sufficiently small to be allowed by the clearance between the adjacent grooves and ridges in members 34 and on the shaft of the rotor assembly this clearance being, as usual, substantial, though small and not illustrated.

During testing, a small amount of water may pass between the semi-circular sealing members 54, and between members 60. This amount is so small as not to be detrimental. However, if absolutely no leakage is desired, a vertically split housing could be provided rather than the horizontally split housing shown, and metallic O-rings could be substituted for the sealing members 54 and 60. Additional O-rings could be provided to prevent leakage through the threads holding the sealing collars on the shaft.

Various other modifications will occur to those skilled in the art, and, accordingly, the scope of the present invention is not desired to be limited except by the following claims.

What is claimed is:

1. A turbine comprising a rotor, a hub on said rotor carrying blades, a housing having a chamber for said hub, an outlet passage on either side of said hub between said housing and said rotor, annular sealing means disposed about the openings to each said passage, a movable thrust bearing engaging the shaft of said rotor and normally preventing axial displacement of said rotor and a first and second flange fixed to said rotor and arranged to engage said annular sealing means to close off both said passages from said chamber when said rotor is displaced along its axis of rotation.

2. A turbine comprising a rotor, a hub on said rotor carrying blades, a housing having a chamber for said hub, an outlet passage on either side of said hub between said housing and said rotor, annular sealing means disposed about the openings to each said passage, a first and second flange fixed to said rotor and arranged to engage said annular sealing means to close off both said passages from said chamber when said rotor is displaced along its axis of rotation, said first flange having a larger effective surface area exposed to the interior of said chamber than said second flange.

3. A turbine comprising a rotor, a hub on said rotor carrying blades, a housing having a chamber for said hub, an outlet passage on either side of said hub between said housing and said rotor, annular sealing means disposed about the openings to each said passage, a first and second flange fixed to said rotor and arranged to engage said annular sealing means to close off both said passages from said chamber when said rotor is displaced along its axis of rotation, one of said annular sealing means having a substantially greater diameter than the other of said annular sealing means.

References Cited

UNITED STATES PATENTS 1,667,992   5/1928   Sherwood et al.
3,088,416   5/1963   Danis _____ 103—111 X

FOREIGN PATENTS 1,237,156   6/1960   France.

MARTIN P. SCHWADRON, *Primary Examiner.*

EVERETTE A. POWELL, JR., *Examiner.*